(12) United States Patent
Ohura et al.

(10) Patent No.: US 10,508,846 B2
(45) Date of Patent: *Dec. 17, 2019

(54) AIR CONDITIONING APPARATUS

(71) Applicant: DAIKIN INDUSTRIES, LTD., Osaka-shi, Osaka (JP)

(72) Inventors: Ryuuta Ohura, Osaka (JP); Junya Minami, Osaka (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/065,045

(22) PCT Filed: Dec. 20, 2016

(86) PCT No.: PCT/JP2016/087966
§ 371 (c)(1),
(2) Date: Jun. 21, 2018

(87) PCT Pub. No.: WO2017/110816
PCT Pub. Date: Jun. 29, 2017

(65) Prior Publication Data
US 2019/0011157 A1  Jan. 10, 2019

(30) Foreign Application Priority Data

Dec. 22, 2015  (JP) ................... 2015-250317

(51) Int. Cl.
F25B 45/00    (2006.01)
F25B 13/00    (2006.01)

(52) U.S. Cl.
CPC .............. F25B 45/00 (2013.01); F25B 13/00 (2013.01); F25B 2313/0233 (2013.01);
(Continued)

(58) Field of Classification Search
CPC ................. F25B 45/00; F25B 2345/00; F25B 2345/001; F25B 2345/003; F25B 13/00
See application file for complete search history.

(56) References Cited

U.S. PATENT DOCUMENTS

| 2009/0126375 A1 | 5/2009 | Toyoshima et al. |
| 2009/0235675 A1 | 9/2009 | Chang et al. |
| 2013/0098072 A1* | 4/2013 | Choi ............... F25B 13/00 62/77 |

FOREIGN PATENT DOCUMENTS

| JP | 2010-2109 A | 1/2010 |
| JP | 2011-12958 A | 1/2011 |

(Continued)

OTHER PUBLICATIONS

International Search Report for PCT/JP2016/087966 (PCT/ISA/210) dated Mar. 7, 2017.

*Primary Examiner* — Eric S Ruppert
(74) *Attorney, Agent, or Firm* — Birch, Stewart, Kolasch & Birch, LLP

(57) ABSTRACT

When charging a refrigerant circuit with refrigerant, a control component starts a heating refrigerant charging operation that is performed by switching the refrigerant circuit to a heating cycle state and performs the heating refrigerant charging operation until a predetermined heating refrigerant charging completion condition is met. Thereafter, the control component switches to a cooling refrigerant charging operation that is performed by switching the refrigerant circuit to a cooling cycle state and performs the cooling refrigerant charging operation until a refrigerant charging completion condition where the refrigerant circuit is charged with a prescribed quantity of the refrigerant is met.

18 Claims, 6 Drawing Sheets

(52) U.S. Cl.
CPC . *F25B 2345/003* (2013.01); *F25B 2600/0253* (2013.01); *F25B 2600/2513* (2013.01); *F25B 2700/1931* (2013.01); *F25B 2700/1933* (2013.01); *F25B 2700/21152* (2013.01); *Y02B 30/741* (2013.01)

(56) References Cited

FOREIGN PATENT DOCUMENTS

| | | |
|---|---|---|
| JP | 2011-85390 A | 4/2011 |
| JP | 2011-117619 A | 6/2011 |

* cited by examiner

AIR CONDITIONING APPARATUS

TECHNICAL FIELD

The present invention relates to an air conditioning apparatus, and particularly an air conditioning apparatus that is configured as a result of an outdoor unit having an outdoor heat exchanger and plural indoor units having indoor heat exchangers being interconnected via a liquid refrigerant communication pipe and a gas refrigerant communication pipe.

BACKGROUND ART

Conventionally, there have been air conditioning apparatuses that are configured as a result of an outdoor unit having an outdoor heat exchanger and plural indoor units having indoor heat exchangers being interconnected via a liquid refrigerant communication pipe and a gas refrigerant communication pipe. As such an air conditioning apparatus, there is an air conditioning apparatus that is switchable to a cooling cycle state, which causes the outdoor heat exchanger to function as a radiator of refrigerant and causes the indoor heat exchangers to function as evaporators of the refrigerant, and a heating cycle state, which causes the outdoor heat exchanger to function as an evaporator of the refrigerant and causes the indoor heat exchangers to function as radiators of the refrigerant. Additionally, as such an air conditioning apparatus, there is, as described in patent document 1 (JP-A No. 2011-85390), an air conditioning apparatus that performs, in the process of charging a refrigerant circuit with the refrigerant after device installation and/or after maintenance, a refrigerant charging operation until the refrigerant circuit is charged with a prescribed quantity of the refrigerant. Here, the air conditioning apparatus of patent document 1 can perform the refrigerant charging operation (a cooling refrigerant charging operation) by switching the refrigerant circuit to the cooling cycle state and perform the refrigerant charging operation (a heating refrigerant charging operation) by switching the refrigerant circuit to the heating cycle state.

SUMMARY OF INVENTION

In the air conditioning apparatus of patent document 1, in a case where the outdoor temperature is low, it is preferred that the air conditioning apparatus perform the heating refrigerant charging operation that performs heating of the rooms, rather than the cooling refrigerant charging operation that performs cooling of the rooms, in order to avoid lowering the indoor temperatures.

However, if the determination of whether or not the refrigerant circuit has been charged with the refrigerant up to the prescribed quantity is performed on the basis of a state quantity of the indoor heat exchangers functioning as radiators of the refrigerant in the heating refrigerant charging operation, the state quantity to be determined becomes plural by virtue of there being a plurality of the indoor heat exchangers, and it is difficult to perform an appropriate determination. That is, in a case where there is a plurality of the indoor heat exchangers, the ease with which the refrigerant accumulates differs depending on the indoor heat exchanger, so if the determination is performed on the basis of state quantities of all the indoor heat exchangers, there is the concern that, at the point in time when it has been determined that the refrigerant has accumulated in an indoor heat exchanger in which it is difficult for the refrigerant to accumulate, the refrigerant will have excessively accumulated in an indoor heat exchanger in which it is easy for the refrigerant to accumulate, resulting in the refrigerant circuit overall becoming overcharged. Furthermore, if the determination is performed on the basis of state quantities of some of the indoor heat exchangers, there is the concern that, at the point in time when it has been determined that the refrigerant has accumulated in an indoor heat exchanger in which it is easy for the refrigerant to accumulate, only a little refrigerant will have accumulated in an indoor heat exchanger in which it is difficult for the refrigerant to accumulate, resulting in the refrigerant circuit overall becoming undercharged.

It is a problem of the present invention to make possible, in an air conditioning apparatus equipped with a refrigerant circuit that is configured as a result of an outdoor unit having an outdoor heat exchanger and plural indoor units having indoor heat exchangers being interconnected via a liquid refrigerant communication pipe and a gas refrigerant communication pipe, a refrigerant charging operation that does not excessively lower the indoor temperatures and can appropriately charge the refrigerant circuit with the prescribed quantity of the refrigerant even in a case where the outdoor temperature is low.

An air conditioning apparatus pertaining to a first aspect is configured as a result of an outdoor unit having an outdoor heat exchanger and plural indoor units having indoor heat exchangers being interconnected via a liquid refrigerant communication pipe and a gas refrigerant communication pipe, and the air conditioning apparatus has a refrigerant circuit and a control component. The refrigerant circuit is switchable to a cooling cycle state, which causes the outdoor heat exchanger to function as a radiator of refrigerant and causes the indoor heat exchangers to function as evaporators of the refrigerant, and a heating cycle state, which causes the outdoor heat exchanger to function as an evaporator of the refrigerant and causes the indoor heat exchangers to function as radiators of the refrigerant. The control component controls devices configuring the outdoor unit and the plural indoor units. Additionally, here, when charging the refrigerant circuit with the refrigerant, the control component starts a heating refrigerant charging operation that is performed by switching the refrigerant circuit to the heating cycle state and performs the heating refrigerant charging operation until a predetermined heating refrigerant charging completion condition is met. Thereafter, the control component switches to a cooling refrigerant charging operation that is performed by switching the refrigerant circuit to the cooling cycle state and performs the cooling refrigerant charging operation until a refrigerant charging completion condition where the refrigerant circuit is charged with a prescribed quantity of the refrigerant is met.

Here, when charging the refrigerant circuit with the refrigerant, the control component is configured to first perform the heating refrigerant charging operation until the heating refrigerant charging completion condition is met, so in comparison to a case where just the cooling refrigerant charging operation is performed, a lowering of the indoor temperatures can be avoided. Moreover, here, after the heating refrigerant charging completion condition has been met, the control component is configured to switch to the cooling refrigerant charging operation and perform the cooling refrigerant charging operation until the refrigerant charging completion condition where the refrigerant circuit is charged with the prescribed quantity of the refrigerant is met, so in comparison to a case where just the heating refrigerant charging operation is performed, the effects of differences in the ease with which the refrigerant accumulates in each indoor heat exchanger can be reduced to prevent overcharging or undercharging of the refrigerant circuit overall.

In this way, here, as described above, by performing a combination of the heating refrigerant charging operation and the cooling refrigerant charging operation, a refrigerant charging operation that does not excessively lower the indoor temperatures and can appropriately charge the refrigerant circuit with the prescribed quantity of the refrigerant even in a case where the outdoor temperature is low can be made possible.

An air conditioning apparatus pertaining to a second aspect is the air conditioning apparatus pertaining to the first aspect, wherein the control component regards the heating refrigerant charging completion condition as being met in a case where it can determine that the section of the refrigerant circuit leading from the liquid-side end of any of the plural indoor heat exchangers via the liquid refrigerant communication pipe to the outdoor unit is filled with the refrigerant in a liquid state.

Reaching the heating refrigerant charging completion condition after the start of the heating refrigerant charging operation means reaching a state in which the refrigerant has accumulated in some of the indoor heat exchangers in which it is easy for the refrigerant to accumulate and the refrigerant has also accumulated in the liquid refrigerant communication pipe on the downstream side thereof. For this reason, here, by performing the heating refrigerant charging operation until the heating refrigerant charging completion condition is met, the control component can, while preventing the refrigerant circuit from becoming overcharged, put the refrigerant circuit in a state in which the refrigerant has accumulated in some of the indoor heat exchangers and the refrigerant has also accumulated in the liquid refrigerant communication pipe.

Because of this, here, by employing the above-described heating refrigerant charging completion condition, the control component can create a state in which the refrigerant circuit is charged with a quantity of the refrigerant that is close to the prescribed quantity even though the refrigerant circuit overall is undercharged, and the operating time of the cooling refrigerant charging operation performed after the heating refrigerant charging operation can be shortened to further keep the indoor temperatures from becoming lower.

An air conditioning apparatus pertaining to a third aspect is the air conditioning apparatus pertaining to the first aspect, wherein the control component regards the heating refrigerant charging completion condition as being met in a case where the degree of subcooling of the refrigerant in any of the plural indoor heat exchangers has become equal to or greater than a predetermined threshold degree of subcooling.

The degrees of subcooling of the refrigerant in the indoor heat exchangers become larger when the refrigerant accumulates in the indoor heat exchangers, so whether or not the refrigerant has accumulated in the indoor heat exchangers can be detected. Thus, here, as described above, the control component is configured to determine, based on whether or not the degrees of subcooling of the refrigerant in the indoor heat exchangers have become equal to or greater than the threshold degree of subcooling, whether or not the heating refrigerant charging completion condition is met.

Because of this, here, whether or not the refrigerant has accumulated in the indoor heat exchangers can be reliably determined by employing the above-described heating refrigerant charging completion condition.

An air conditioning apparatus pertaining to a fourth aspect is the air conditioning apparatus pertaining to the first or third aspect, wherein the control component regards the heating refrigerant charging completion condition as being met in a case where the temperature difference between the temperature of the refrigerant in any of the plural indoor heat exchangers and the temperature of the refrigerant flowing through the liquid refrigerant communication pipe has become equal to or less than a predetermined threshold liquid temperature difference.

When the refrigerant accumulates in the liquid refrigerant communication pipe, the temperature of the refrigerant in the section of the liquid refrigerant communication pipe near the outdoor unit becomes closer to the temperature of the refrigerant in the section of the liquid refrigerant communication pipe near the indoor units, so whether or not the refrigerant has accumulated in the liquid refrigerant communication pipe can be detected. Thus, here, as described above, the control component is configured to determine, based on whether or not the temperature difference between the temperature of the refrigerant in any of the plural indoor heat exchangers and the temperature of the refrigerant flowing through the liquid refrigerant communication pipe has become equal to or less than the predetermined threshold liquid temperature difference, whether or not the heating refrigerant charging completion condition is met.

Because of this, here, whether or not the refrigerant has accumulated in the liquid refrigerant communication pipe can be reliably determined by employing the above-described heating refrigerant charging completion condition.

An air conditioning apparatus pertaining to a fifth aspect is the air conditioning apparatus pertaining to any of the first, third and fourth aspects, wherein the plural indoor units each have, on the liquid-side end of the indoor heat exchanger, an indoor expansion valve that adjusts the flow rate of the refrigerant flowing through the indoor heat exchanger. Additionally, the control component regards the heating refrigerant charging completion condition as being met in a case where the opening degree of any of the plural indoor expansion valves has become equal to or greater than a predetermined threshold valve opening degree.

When the refrigerant accumulates in the indoor heat exchangers, the degrees of subcooling of the refrigerant in the indoor heat exchangers become larger. At this time, for example, as the control component controls the opening degrees of the indoor expansion valves in such a way as to bring the degrees of subcooling of the refrigerant in the indoor heat exchangers closer to target degrees of subcooling, the opening degrees of the indoor expansion valves become larger as the degrees of subcooling of the refrigerant in the indoor heat exchangers become larger, so whether or not the refrigerant has accumulated in the indoor heat exchangers can be detected. Thus, here, as described above, the control component is configured to determine, based on whether or not the opening degree of any of the plural indoor expansion valves has become equal to or greater than the predetermined threshold valve opening degree, whether or not the heating refrigerant charging completion condition is met.

Because of this, here, whether or not the refrigerant has accumulated in the indoor heat exchangers can be reliably determined by employing the above-described heating refrigerant charging completion condition.

An air conditioning apparatus pertaining to a sixth aspect is the air conditioning apparatus pertaining to any of the first to fifth aspects, wherein when charging the refrigerant circuit with the refrigerant, the control component can start the cooling refrigerant charging operation and perform the cooling refrigerant charging operation until the refrigerant charging completion condition is met, without performing the heating refrigerant charging operation.

In a case where the outdoor temperature is not low, it is alright not to avoid lowering the indoor temperatures, so when charging the refrigerant circuit with the refrigerant, performing just the cooling refrigerant charging operation is permitted. Thus, here, as described above, when charging the refrigerant circuit with the refrigerant, the control component is configured to also be able to start the cooling refrigerant charging operation and perform the cooling refrigerant charging operation until the refrigerant charging completion condition is met, without performing the heating refrigerant charging operation.

Because of this, here, as described above, the control component is configured to also be able to perform just the cooling refrigerant charging operation, so that a refrigerant charging operation that can appropriately charge the refrigerant circuit with the prescribed quantity of the refrigerant also in a case where the outdoor temperature is not low can be made possible.

An air conditioning apparatus pertaining to a seventh aspect is the air conditioning apparatus pertaining to the sixth aspect, wherein the control component selects, in accordance with the outdoor temperature or the indoor temperatures, whether or not to perform the heating refrigerant charging operation when charging the refrigerant circuit with the refrigerant.

As described above, in a case where the outdoor temperature is low and one wants to avoid lowering the indoor temperatures, it is preferable to perform the heating refrigerant charging operation, and in a case where the outdoor temperature is not low and it is alright not to avoid lowering the indoor temperatures, it is alright not to perform the heating refrigerant charging operation. Thus, here, as described above, the control component is configured to select whether or not to perform the heating refrigerant charging operation when charging the refrigerant circuit with the refrigerant in accordance with the outdoor temperature or the indoor temperatures.

Because of this, here, as described above, by selecting whether or not to perform the heating refrigerant charging operation in accordance with the outdoor temperature or the indoor temperatures, the control component can appropriately choose between performing a refrigerant charging operation that performs a combination of the heating refrigerant charging operation and the cooling refrigerant charging operation and a refrigerant charging operation that performs just the cooling refrigerant charging operation.

DESCRIPTION OF EMBODIMENT

An embodiment of an air conditioning apparatus pertaining to the invention will be described below on the basis of the drawings. It should be noted that the specific configurations of the embodiment of the air conditioning apparatus pertaining to the invention are not limited to those in the following embodiment and its example modifications and can be changed to the extent that they do not depart from the spirit of the invention.

(1) CONFIGURATION OF AIR CONDITIONING APPARATUS

Figure 1:
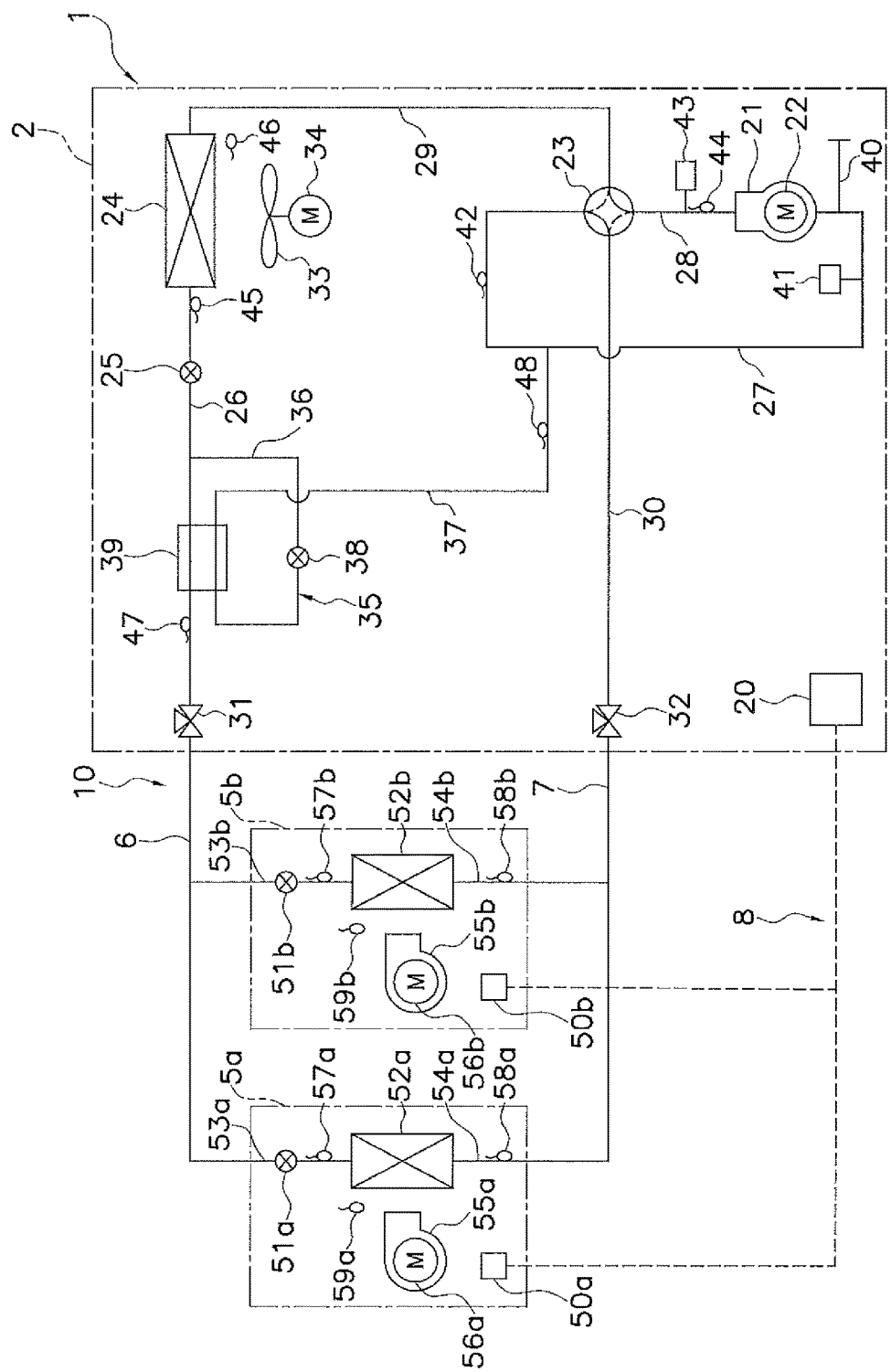
FIG. 1 is general configuration diagram of an air conditioning apparatus pertaining to an embodiment of the invention.

FIG. 1 is a general configuration diagram of an air conditioning apparatus 1 pertaining to the embodiment of the invention. The air conditioning apparatus 1 is an apparatus that uses a vapor compression refrigeration cycle to perform cooling and heating of rooms in a building, for example. The air conditioning apparatus 1 mainly has an outdoor unit 2, plural (here, two) indoor units 5a and 5b connected to each other in parallel, and a liquid refrigerant communication pipe 6 and a gas refrigerant communication pipe 7 that interconnect the outdoor unit 2 and the indoor units 5a and 5b. Additionally, a vapor compression refrigerant circuit 10 of the air conditioning apparatus 1 is configured as a result of the outdoor unit 2 and the plural indoor units 5a and 5b being interconnected via the liquid refrigerant communication pipe 6 and the gas refrigerant communication pipe 7.

<Indoor Units>

The indoor units 5a and 5b are installed in rooms of a building, for example. The indoor units 5a and 5b are connected to the outdoor unit 2 via the liquid refrigerant communication pipe 6 and the gas refrigerant communication pipe 7 as described above and configure part of the refrigerant circuit 10.

Next, the configuration of the indoor units 5a and 5b will be described. It should be noted that because the indoor unit 5a and the indoor unit 5b have the same configuration, just the configuration of the indoor unit 5a will be described here, and regarding the configuration of the indoor unit 5b, the suffix "b" will be assigned instead of the suffix "a" denoting parts of the indoor unit 5a, and description of the parts of the indoor unit 5b will be omitted.

The indoor unit 5a mainly has an indoor expansion valve 51a and an indoor heat exchanger 52a. Furthermore, the indoor unit 5a has an indoor liquid refrigerant pipe 53a, which interconnects the liquid-side end of the indoor heat exchanger 52a and the liquid refrigerant communication pipe 6, and an indoor gas refrigerant pipe 54a, which interconnects the gas-side end of the indoor heat exchanger 52a and the gas refrigerant communication pipe 7.

The indoor expansion valve 51a is an electric expansion valve capable of opening degree adjustment that performs, for example, adjustment of the flow rate of the refrigerant flowing through the indoor heat exchanger 52a, and the indoor expansion valve 51a is provided in the indoor liquid refrigerant pipe 53a.

The indoor heat exchanger 52a is a heat exchanger for performing heat exchange between the refrigerant and the indoor air. The liquid-side end of the indoor heat exchanger 52a is connected to the indoor liquid refrigerant pipe 53a, and the gas-side end of the indoor heat exchanger 52a is connected to the indoor gas refrigerant pipe 54a. Here, the indoor unit 5a has an indoor fan 55a for sucking the indoor air into the indoor unit 5a, causing the indoor air to exchange heat with the refrigerant in the indoor heat exchanger 52a, and thereafter supplying the air as supply air to the room. That is, the indoor unit 5a has the indoor fan 55a as a fan that supplies to the indoor heat exchanger 52a the indoor air serving as a heating source or a cooling source for the refrigerant flowing through the indoor heat exchanger 52a. The indoor fan 55a is driven by an indoor fan motor 56a.

The indoor unit 5a is provided with various sensors. Specifically, the indoor unit 5a is provided with an indoor heat exchanger liquid-side sensor 57a that detects a temperature Trla of the refrigerant at the liquid-side end of the indoor heat exchanger 52a, an indoor heat exchanger gas-side sensor 58a that detects a temperature Trga of the refrigerant at the gas-side end of the indoor heat exchanger 52a, and an indoor air sensor 59a that detects a temperature Traa of the indoor air sucked into the indoor unit 5a.

The indoor unit 5a has an indoor-side control component 50a that controls the actions of the parts configuring the indoor unit 5a. Additionally, the indoor-side control component 50a has a microcomputer and a memory provided in order to perform control of the indoor unit 5a and can exchange control signals and so forth with the outdoor unit 2 via a communication line. Here, in a case where a remote controller (not shown in the drawings) for individually operating the indoor unit 5a is provided, the remote controller is also included in the indoor-side control component 50a.

<Outdoor Unit>

The outdoor unit 2 is installed outside the building, for example. The outdoor unit 2 is connected to the indoor units 5a and 5b via the liquid refrigerant communication pipe 6 and the gas refrigerant communication pipe 7 as described above and configures part of the refrigerant circuit 10.

Next, the configuration of the outdoor unit 2 will be described.

The outdoor unit 2 mainly has a compressor 21, a switching mechanism 23, an outdoor heat exchanger 24, and an outdoor expansion valve 25. Furthermore, the outdoor unit 2 has an outdoor liquid refrigerant pipe 26 that interconnects the liquid-side end of the outdoor heat exchanger 24 and the liquid refrigerant communication pipe 6, a suction pipe 27 that interconnects the switching mechanism 23 and the suction side of the compressor 21, a discharge pipe 28 that interconnects the discharge side of the compressor 21 and the switching mechanism 23, a first outdoor gas refrigerant pipe 29 that interconnects the switching mechanism 23 and the gas-side end of the outdoor heat exchanger 24, and a second outdoor gas refrigerant pipe 30 that interconnects the gas refrigerant communication pipe 7 and the switching mechanism 23. A liquid-side stop valve 31 is provided where the outdoor liquid refrigerant pipe 26 and the liquid refrigerant communication pipe 6 connect to each other, and a gas-side stop valve 32 is provided where the second outdoor gas refrigerant pipe 30 and the gas refrigerant communication pipe 7 connect to each other. The liquid-side stop valve 31 and the gas-side stop valve 32 are valves that are manually opened and closed.

The compressor 21 is a device that compresses low-pressure refrigerant to a high pressure. Here, as the compressor 21, a compressor with a closed structure where a rotary-type or scroll-type positive displacement compression element (not shown in the drawings) is driven to rotate by a compressor motor 22 is used. Furthermore, here, the rotational speed of the compressor motor 22 is controllable by an inverter or the like, so that the capacity of the compressor 21 is controllable.

The switching mechanism 23 is a four-port switching valve that can switch the flow direction of the refrigerant in the refrigerant circuit 10. Here, in the cooling operation, the switching mechanism 23 is a mechanism capable of switching that causes the suction side of the compressor 21 to communicate with the gas refrigerant communication pipe 7 through the suction pipe 27 and the second outdoor gas refrigerant pipe 30 and causes the discharge side of the compressor 21 to communicate with the gas-side end of the outdoor heat exchanger 24 through the discharge pipe 28 and the first outdoor gas refrigerant pipe 29. That is, because of this switching of the switching mechanism 23, the refrigerant circuit 10 is switchable to a cooling cycle state (see the solid lines of the switching mechanism 23 in FIG. 1) that causes the outdoor heat exchanger 24 to function as a radiator of the refrigerant and causes the indoor heat exchangers 52a and 52b to function as evaporators of the refrigerant. Furthermore, in the heating operation, the switching mechanism 23 is a mechanism capable of switching that causes the suction side of the compressor 21 to communicate with the gas-side end of the outdoor heat exchanger 24 through the suction pipe 27 and the first outdoor gas refrigerant pipe 29 and causes the discharge side of the compressor 21 to communicate with the gas refrigerant communication pipe 7 through the discharge pipe 28 and the second outdoor gas refrigerant pipe 30. That is, because of this switching of the switching mechanism 23, the refrigerant circuit 10 is switchable to a heating cycle state (see the dashed lines of the switching mechanism 23 in FIG. 1) that causes the outdoor heat exchanger 24 to function as an evaporator of the refrigerant and causes the indoor heat exchangers 52a and 52b to function as radiators of the refrigerant. It should be noted that the switching mechanism 23 is not limited to a four-port switching valve and may also be configured in such a way that it can, through a combination of plural electromagnetic valves and refrigerant pipes, perform the switching of the flow direction of the refrigerant described above.

The outdoor heat exchanger 24 is a device for performing heat exchange between the refrigerant and the outdoor air. The liquid-side end of the outdoor heat exchanger 24 is connected to the outdoor liquid refrigerant pipe 26, and the gas-side end of the outdoor heat exchanger 24 is connected to the first outdoor gas refrigerant pipe 29. Here, the outdoor unit 2 has an outdoor fan 33 for sucking the outdoor air into the outdoor unit 2, causing the outdoor air to exchange heat with the refrigerant in the outdoor heat exchanger 24, and exhausting the air to the outside of the unit. That is, the outdoor unit 2 has the outdoor fan 33 as a fan that supplies to the outdoor heat exchanger 24 the outdoor air serving as a cooling source or a heating source for the refrigerant flowing through the outdoor heat exchanger 24. The outdoor fan 33 is driven by an outdoor fan motor 34.

The outdoor expansion valve 25 is an electric expansion valve capable of opening degree adjustment that performs, for example, adjustment of the flow rate of the refrigerant flowing through the outdoor heat exchanger 24, and the outdoor expansion valve 25 is provided in the outdoor liquid refrigerant pipe 26.

Furthermore, a refrigerant return pipe 35 is connected to, and a refrigerant cooler 39 is provided in, the outdoor liquid refrigerant pipe 26. The refrigerant return pipe 35 is a refrigerant pipe that diverts some of the refrigerant flowing through the outdoor liquid refrigerant pipe 26 and returns the diverted refrigerant to the compressor 21. The refrigerant cooler 39 is a heat exchanger that uses the refrigerant flowing through the refrigerant return pipe 35 to cool the refrigerant flowing through the outdoor liquid refrigerant pipe 26; here, the refrigerant cooler 39 is provided in the section of the outdoor liquid refrigerant pipe 26 on the liquid refrigerant communication pipe 6 side of the outdoor expansion valve 25.

The refrigerant return pipe 35 here is a refrigerant pipe that sends to the suction side of the compressor 21 the refrigerant diverted from the outdoor liquid refrigerant pipe 26. Additionally, the refrigerant return pipe 35 mainly has a refrigerant return inlet pipe 36 and a refrigerant return outlet pipe 37. The refrigerant return inlet pipe 36 is a refrigerant pipe that diverts some of the refrigerant flowing through the outdoor liquid refrigerant pipe 26 and sends the diverted refrigerant to an inlet on the refrigerant return pipe 35 side of the refrigerant cooler 39; here, the refrigerant return inlet pipe 36 is connected to the section of the outdoor liquid refrigerant pipe 26 between the outdoor expansion valve 25 and the refrigerant cooler 39. A refrigerant return expansion valve 38 that performs, for example, adjustment of the flow rate of the refrigerant flowing through the refrigerant return pipe 35 is provided in the refrigerant return inlet pipe 36. Here, the refrigerant return expansion valve 38 is an electric expansion valve. The refrigerant return outlet pipe 37 is a refrigerant pipe that sends the diverted refrigerant from an outlet on the refrigerant return pipe 35 side of the refrigerant cooler 39 to the suction pipe 27 connected to the suction side of the compressor 21. Additionally, the refrigerant cooler 39 uses low-pressure refrigerant flowing through the refrigerant return pipe 35 to cool the refrigerant flowing through the outdoor liquid refrigerant pipe 26. It should be noted that the refrigerant return pipe 35 may also be a refrigerant pipe that sends the refrigerant to the middle of the compression process of the compressor 21 rather than to the suction side of the compressor 21. In this case, the refrigerant cooler 39 uses intermediate-pressure refrigerant flowing through the refrigerant return pipe 35 to cool the refrigerant flowing through the outdoor liquid refrigerant pipe 26.

Furthermore, the refrigerant circuit 10 is provided with a service nozzle 40 for connecting a refrigerant tank, for example, when charging the refrigerant circuit 10 with the refrigerant. Here, the service nozzle 40 is connected to the suction pipe 27. It should be noted that the position where the service nozzle 40 is provided is not limited to the suction pipe 27 and may also be another position in the refrigerant circuit 10. Furthermore, in a case where the stop valves 31 and 32 have service ports, the service ports of the stop valves 31 and 32 may be used as the service nozzle 40.

The outdoor unit 2 is provided with various sensors. Specifically, provided in the vicinity of the compressor 21 of the outdoor unit 2 are a suction pressure sensor 41 that detects a suction pressure Ps of the compressor 21, a suction temperature sensor 42 that detects a suction temperature Ts of the compressor 21, a discharge pressure sensor 43 that detects a discharge pressure Pd of the compressor 21, and a discharge temperature sensor 44 that detects a discharge temperature Td of the compressor 21. Furthermore, provided in the section of the outdoor liquid refrigerant pipe 26 on the outdoor heat exchanger 24 side of the refrigerant cooler 39 (here, the section on the outdoor heat exchanger 24 side of the outdoor expansion valve 25) is an outdoor heat exchanger liquid-side sensor 45 that detects a temperature Tol of the refrigerant at the liquid-side end of the outdoor heat exchanger 24. Furthermore, provided in the vicinity of the outdoor heat exchanger 24 or the outdoor fan 33 is an outdoor air sensor 46 that detects a temperature Toa of the outdoor air sucked into the outdoor unit 2. Furthermore, provided in the section of the outdoor liquid refrigerant pipe 26 between the refrigerant cooler 39 and the liquid-side stop valve 31 is a liquid pipe-side sensor 47 that detects a temperature Tlp of the refrigerant sent from the refrigerant cooler 39 to the liquid refrigerant communication pipe 6 or the refrigerant sent from the liquid refrigerant communication pipe 6 to the refrigerant cooler 39. Moreover, provided in the refrigerant return outlet pipe 37 is a refrigerant return-side sensor 48 that detects a temperature Tor of the refrigerant flowing through the outlet on the refrigerant return pipe 35 side of the refrigerant cooler 39.

The outdoor unit 2 has an outdoor-side control component 20 that controls the actions of the parts configuring the outdoor unit 2. Additionally, the outdoor-side control component 20 has a microcomputer and a memory provided in order to perform control of the outdoor unit 2 and can exchange controls signals and so forth via a communication line with the indoor-side control components 50a and 50b of the indoor units 5a and 5b.

<Refrigerant Communication Pipes>

The refrigerant communication pipes 6 and 7 are refrigerant pipes constructed on site when installing the air conditioning apparatus 1 in an installation location such as a building, and pipes having various lengths and pipe diameters are used in accordance with installation conditions such as the installation location and the combination of the outdoor unit 2 and the indoor units 5a and 5b.

<Control Component>

Figure 2:
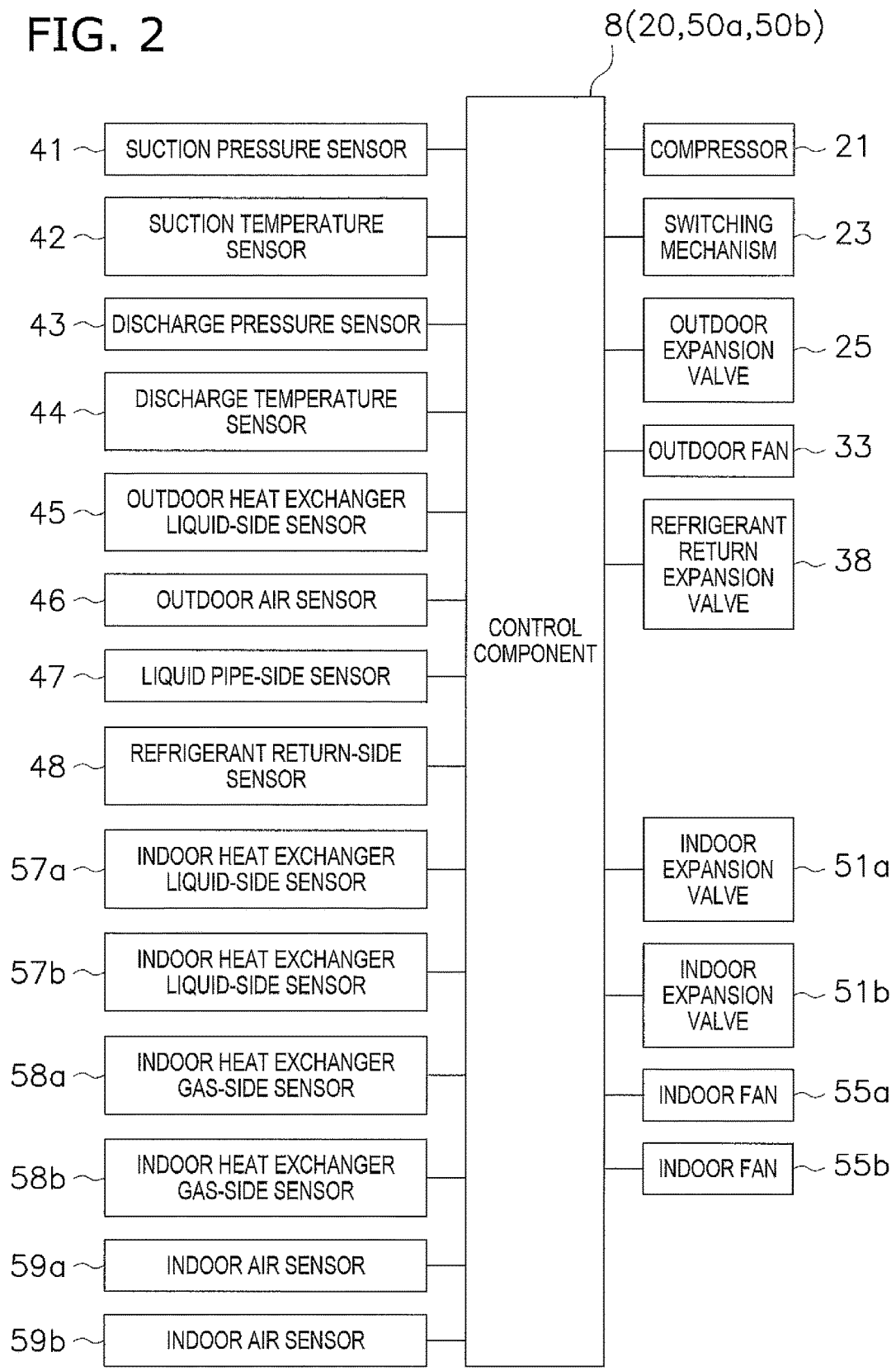
FIG. 2 is a control block diagram of the air conditioning apparatus.

The indoor-side control components 50a and 50b of the indoor units 5a and 5b and the outdoor-side control component 20 of the outdoor unit 2 are communicably interconnected via a communication line or the like to configure a control component 8 that performs operation control of the entire air conditioning apparatus 1. As shown in FIG. 2, the control component 8 is connected in such a way that it can receive detection signals of the various sensors 41 to 48, 57a to 59a, and 57b to 59b and is connected in such a way that it can control the various devices 21, 23, 25, 33, 38, 51a, 55a, 51b, and 55b on the basis of these detection signals. Here, FIG. 2 is a control block diagram of the air conditioning apparatus 1.

As described above, the air conditioning apparatus 1 is configured as a result of the outdoor unit 2 having the outdoor heat exchanger 24 and the plural indoor units 5a and 5b having the indoor heat exchangers 52a and 52b being interconnected via the liquid refrigerant communication pipe 6 and the gas refrigerant communication pipe 7, and the air conditioning apparatus 1 has the refrigerant circuit 10 and the control component 8. The refrigerant circuit 10 is switchable to the cooling cycle state, which causes the outdoor heat exchanger 24 to function as a radiator of the refrigerant and causes the indoor heat exchangers 52a and 52b to function as evaporators of the refrigerant, and the heating cycle state, which causes the outdoor heat exchanger 24 to function as an evaporator of the refrigerant and causes the indoor heat exchangers 52a and 52b to function as radiators of the refrigerant. The control component 8 controls the devices configuring the outdoor unit 2 and the plural indoor units 5a and 5b.

(2) ACTIONS OF AIR CONDITIONING APPARATUS IN NORMAL OPERATING MODE

Next, the actions (normal operating mode) of the air conditioning apparatus 1 when performing control of the devices configuring the outdoor unit 2 and the indoor units 5a and 5b in accordance with the operating loads of the plural indoor units 5a and 5b will be described.

The normal operating mode mainly includes the cooling operation that performs cooling of the rooms and the heating operation that performs heating of the rooms. The control of the devices configuring the outdoor unit 2 and the plural indoor units 5a and 5b in the normal operating mode described below is performed by the control component 8.

<Cooling Operation>

The cooling operation in the normal operating mode will be described using FIG. 1 and FIG. 2.

When an instruction for the cooling operation is given by input from a remote controller (not shown in the drawings) or the like, by the control component 8, the switching mechanism 23 switches in such a way that the refrigerant circuit 10 switches to the cooling cycle state (the state indicated by the solid lines of the switching mechanism 23 in FIG. 1), the compressor 21, the outdoor fan 33, and the indoor fans 55a and 55b start up, and the expansion valves 25, 38, 51a, and 51b, among other devices, perform predetermined actions.

When this happens, the low-pressure gas refrigerant in the refrigerant circuit 10 is sucked into the compressor 21, compressed, and becomes high-pressure gas refrigerant. The high-pressure gas refrigerant is sent through the switching mechanism 23 to the outdoor heat exchanger 24.

The high-pressure gas refrigerant that has been sent to the outdoor heat exchanger 24 exchanges heat with the outdoor air supplied by the outdoor fan 33, is cooled, and thereby condenses to become high-pressure liquid refrigerant in the outdoor heat exchanger 24 functioning as a radiator of the refrigerant. The high-pressure liquid refrigerant is sent through the outdoor expansion valve 25 to the refrigerant cooler 39.

The high-pressure liquid refrigerant that has been sent to the refrigerant cooler 39 exchanges heat with the refrigerant flowing through the refrigerant return pipe 35, is further cooled, and is sent through the liquid-side stop valve 31 and the liquid refrigerant communication pipe 6 from the outdoor unit 2 to the indoor units 5a and 5b. At this time, some of the high-pressure liquid refrigerant flowing through the outdoor liquid refrigerant pipe 26 is diverted to the refrigerant return pipe 35 and is reduced in pressure by the refrigerant return expansion valve 38. Additionally, the refrigerant that has been reduced in pressure by the refrigerant return expansion valve 38 is sent to the refrigerant cooler 39, exchanges heat with the high-pressure liquid refrigerant flowing through the outdoor liquid refrigerant pipe 26, is heated, thereby evaporates to become gas refrigerant, and is returned to the compressor 21.

The high-pressure liquid refrigerant that has been sent to the indoor units 5a and 5b is reduced in pressure by the indoor expansion valves 51a and 51b to become low-pressure refrigerant in a gas-liquid two-phase state. The low-pressure refrigerant in the gas-liquid two-phase state is sent to the indoor heat exchangers 52a and 52b.

The low-pressure refrigerant in the gas-liquid two-phase state that has been sent to the indoor heat exchangers 52a and 52b exchanges heat with the indoor air supplied by the indoor fans 55a and 55b, is heated, and thereby evaporates to become low-pressure gas refrigerant in the indoor heat exchangers 52a and 52b functioning as evaporators of the refrigerant. The low-pressure gas refrigerant is sent through the gas refrigerant communication pipe 7 from the indoor units 5a and 5b to the outdoor unit 2.

The low-pressure gas refrigerant that has been sent to the outdoor unit 2 is sucked through the gas-side stop valve 32 and the switching mechanism 23 back into the compressor 21.

<Heating Operation>

The heating operation in the normal operating mode will be described using FIG. 1 and FIG. 2.

When an instruction for the heating operation is given by input from a remote controller (not shown in the drawings) or the like, by the controller 8, the switching mechanism 23 switches in such a way that the refrigerant circuit 10 switches to the heating cycle state (the state indicated by the dashed lines of the switching mechanism 23 in FIG. 1), the compressor 21, the outdoor fan 33, and the indoor fans 55a and 55b start up, and the expansion valves 25, 38, 51a, and 51b, among other devices, perform predetermined actions.

When this happens, the low-pressure gas refrigerant in the refrigerant circuit 10 is sucked into the compressor 21, compressed, and becomes high-pressure gas refrigerant. The high-pressure gas refrigerant is sent through the switching mechanism 23, the gas-side stop valve 32 and the gas refrigerant communication pipe 7 from the outdoor unit 2 to the indoor units 5a and 5b.

The high-pressure gas refrigerant that has been sent to the indoor units 5a and 5b is sent to the indoor heat exchangers 52a and 52b.

The high-pressure gas refrigerant that has been sent to the indoor heat exchangers 52a and 52b exchanges heat with the indoor air supplied by the indoor fans 55a and 55b, is cooled, and thereby condenses to become high-pressure liquid refrigerant in the indoor heat exchangers 52a and 52b functioning as radiators of the refrigerant. The high-pressure liquid refrigerant is sent through the indoor expansion valves 51a and 51b and the liquid refrigerant communication pipe 6 from the indoor units 5a and 5b to the outdoor unit 2.

The refrigerant that has been sent to the outdoor unit 2 is sent through the liquid-side stop valve 31 and the refrigerant cooler 39 to the outdoor expansion valve 25, is reduced in pressure by the outdoor expansion valve 25, and becomes low-pressure refrigerant in a gas-liquid two-phase state. The low-pressure refrigerant in the gas-liquid two-phase state is sent to the outdoor heat exchanger 24.

The low-pressure refrigerant in the gas-liquid two-phase state that has been sent to the outdoor heat exchanger 24 exchanges heat with the outdoor air supplied by the outdoor fan 33, is heated, and thereby evaporates to become low-pressure gas refrigerant in the outdoor heat exchanger 24 functioning as an evaporator of the refrigerant. The low-pressure gas refrigerant is sucked through the switching mechanism 23 back into the compressor 21.

(3) ACTIONS IN REFRIGERANT CHARGING OPERATION MODE OF AIR CONDITIONING APPARATUS

Figure 3:
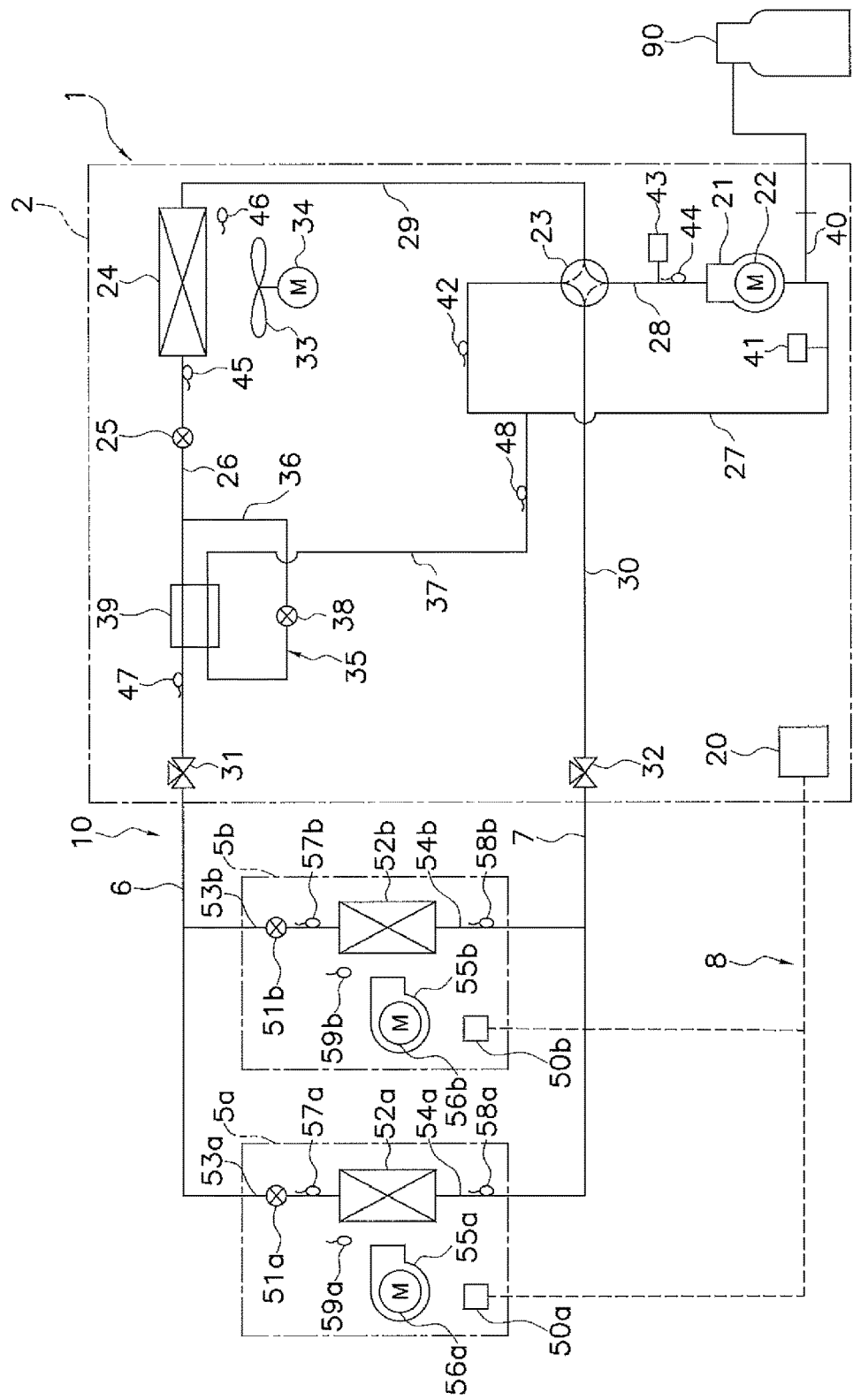
FIG. 3 is a general configuration diagram of the air conditioning apparatus when charging a refrigerant circuit with refrigerant.

Next, the actions (refrigerant charging operation mode) of the air conditioning apparatus 1 when charging the refrigerant circuit 10 with a prescribed quantity of the refrigerant after installation and/or after maintenance of the air conditioning apparatus 1 will be described. Here, as shown in FIG. 3, a case where a refrigerant tank 90 is connected to the service port 40 of the refrigerant circuit 10 and the refrigerant circuit 10 is charged with the refrigerant until reaching the prescribed quantity will be taken as an example and described. It should be noted that, although it is not employed here, in a case where the outdoor unit 2 has a refrigerant storage tank (not shown in the drawings), the refrigerant circuit 10 may also be charged with the refrigerant from the refrigerant storage tank.

The refrigerant charging operation mode mainly has a first refrigerant charging operation, which is suited for a case where the outdoor temperature is not low and it is alright not to avoid lowering the room temperatures, and a second refrigerant charging operation, which is suited for a case where the outdoor temperature is low and one wants to avoid lowering the indoor temperatures. Control of the devices configuring the outdoor unit 2 and the plural indoor units 5a and 5b in the refrigerant charging operation mode described below is performed by the control component 8.

<First Refrigerant Charging Operation>

The first refrigerant charging operation in the refrigerant charging operation mode will be described using FIG. 3 and FIG. 4. Here, the first refrigerant charging operation is a refrigerant charging operation that is suited for a case where the outdoor temperature is not low and it is alright not to avoid lowering the indoor temperatures; here, the first refrigerant charging operation is configured to be capable of being selected and instructed by a worker who performs the work of charging the refrigerant circuit 10 with the refrigerant.

First, prior to the first refrigerant charging operation, charging of the refrigerant circuit 10 with the refrigerant is enabled by, for example, connecting the refrigerant tank 90 to the refrigerant circuit 10 through the service nozzle 40. Here, in a case where the refrigerant circuit 10 is configured using the outdoor unit 2 charged with refrigerant beforehand, the refrigerant circuit 10 is filled with this refrigerant in advance. Furthermore, in a case where the outdoor unit 2 is not charged with refrigerant beforehand, the refrigerant circuit 10 is filled in advance with refrigerant from the refrigerant tank 90, for example, to an extent that device damage or the like does not occur when performing the first refrigerant charging operation.

Figure 4:
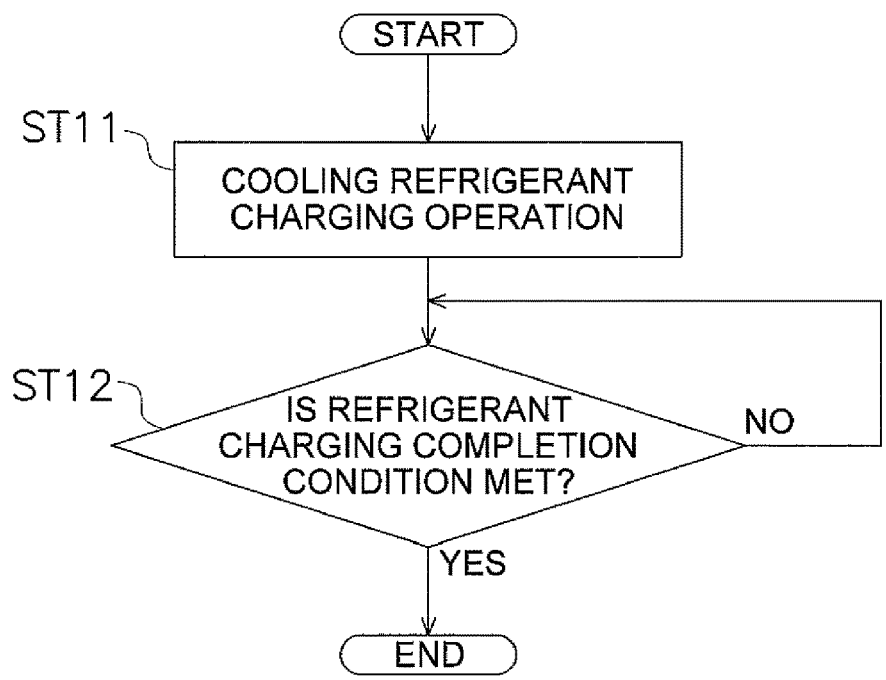
FIG. 4 is a flowchart of a first refrigerant charging operation.

Next, when an instruction for the first refrigerant charging operation is given by input from a remote controller (not shown in the drawings) or the like, the processes of steps ST11 and ST12 shown in FIG. 4 are performed by the control component 8.

—Step ST11—

When a command to start the first refrigerant charging operation is given, a cooling refrigerant charging operation that controls constituent devices including the compressor 21 in such a way that the refrigerant in the refrigerant circuit 10 reaches a predetermined circulation state is performed in step ST11. Here, the predetermined circulation state in the cooling refrigerant charging operation is a state in which the switching mechanism 23 switches in such a way that the refrigerant circuit 10 switches to the cooling cycle state (the state indicated by the solid lines of the switching mechanism 23 in FIG. 3) and all the indoor units 5a and 5b are controlled to forcibly perform the cooling operation (hereafter called "all-indoor-units cooling"). Because of this, in the compressor 21, low-pressure gas refrigerant flows while being compressed to a high pressure.

In the section of the refrigerant circuit 10 leading from the discharge side of the compressor 21 through the discharge pipe 28, the switching mechanism 23, and the first outdoor gas refrigerant pipe 29 to the gas-side end of the outdoor heat exchanger 24, high-pressure gas refrigerant flows. In the outdoor heat exchanger 24, high-pressure refrigerant flows while undergoing a phase change from a gas state to a liquid state because of heat exchange with the outdoor air. In the section of the refrigerant circuit 10 leading from the liquid-side end of the outdoor heat exchanger 24 through the outdoor liquid refrigerant pipe 26, the outdoor expansion valve 25, the refrigerant cooler 39, the liquid-side stop valve 31, the liquid refrigerant communication pipe 6, and the indoor liquid refrigerant pipes 53a and 53b to the indoor expansion valves 51a and 51b, high-pressure liquid refrigerant flows. In the section of the refrigerant circuit 10 leading from the indoor expansion valves 51a and 51b through the indoor liquid refrigerant pipes 53a and 53b to the liquid-side ends of the indoor heat exchangers 52a and 52b, low-pressure refrigerant in a gas-liquid two-phase state flows. In the indoor heat exchangers 52a and 52b, low-pressure refrigerant flows while undergoing a phase change from the gas-liquid two-phase state to a gas state because of heat exchange with the indoor air. In the section of the refrigerant circuit 10 leading from the gas-side ends of the indoor heat exchangers 52a and 52b through the indoor gas refrigerant pipes 54a and 54b, the gas refrigerant communication pipe 7, the second outdoor gas refrigerant pipe 30, the gas-side stop valve 32, the switching mechanism 23, and the suction pipe 27 to the suction side of the compressor 21, low-pressure gas refrigerant flows.

Moreover, here, the control component 8 controls (hereinafter called "low pressure control") the operating capacity of the compressor 21 (here, the rotational speed of the compressor motor 22) in such a way that a low pressure Pe (evaporation temperature Te) in the refrigerant circuit 10 becomes constant at a target low pressure Pes (target evaporation temperature Tes). Here, as the low pressure Pe (evaporation temperature Te) in the refrigerant circuit 10, the suction pressure Ps (a value obtained by converting the suction pressure Ps to the saturation temperature of the refrigerant) of the compressor 21 detected by the suction pressure sensor 41 can be used. This stabilizes the low pressure Pe (evaporation temperature Te) and a high pressure Pc (condensation temperature Tc) in the refrigerant circuit 10.

Furthermore, here, the control component 8 controls (hereinafter called "indoor degree of superheat control") the opening degrees of the indoor expansion valves 51a and 51b in such a way that degrees of superheat SHra and SHrb of the refrigerant in the indoor heat exchangers 52a and 52b functioning as evaporators of the refrigerant become constant at target degrees of superheat SHras and SHrbs. Here, as the degrees of superheat SHra and SHrb of the refrigerant in the indoor heat exchangers 52a and 52b, temperature differences obtained by subtracting the evaporation temperature Te in the refrigerant circuit 10 from the temperatures Trga and Trgb of the refrigerant at the gas-side ends of the indoor heat exchangers 52a and 52b detected by the indoor heat exchanger gas-side sensors 58a and 58b can be used. As the evaporation temperature Te in the refrigerant circuit 10, a value obtained by converting the suction pressure Ps of the compressor 21 detected by the suction pressure sensor 41 to the saturation temperature of the refrigerant, or the temperatures Trla and Trlb of the refrigerant at the liquid-side ends of the indoor heat exchangers 52a and 52b detected by the outdoor heat exchanger liquid-side sensors 57a and 57b, can be used. Because of this, low-pressure gas refrigerant reliably flows in the section of the refrigerant circuit 10 leading from the gas-side ends of the indoor heat exchangers 52a and 52b through the indoor gas refrigerant pipes 54a and 54b, the gas refrigerant communication pipe 7, the second outdoor gas refrigerant pipe 30, the gas-side stop valve 32, the switching mechanism 23, and the suction pipe 27 to the suction side of the compressor 21. Furthermore, this stabilizes the quantity of the refrigerant accumulating in the indoor heat exchangers 52a and 52b functioning as evaporators of the refrigerant.

Moreover, here, the control component 8 controls (hereinafter called "liquid pipe temperature control") the heat exchange capacity of the refrigerant cooler 39 (here, the opening degree of the refrigerant return expansion valve 38) in such a way that the temperature Tlp of the refrigerant sent from the refrigerant cooler 39 through the liquid refrigerant communication pipe 6 to the indoor expansion valves 51*a* and 51*b* becomes constant at a target liquid pipe temperature Tlps. Here, as the temperature Tlp of the refrigerant, the temperature of the refrigerant detected by the liquid pipe-side sensor 47 can be used. Because of this, high-pressure liquid refrigerant flows in the section of the refrigerant circuit 10 leading from the refrigerant cooler 39 through the liquid-side stop valve 31, the liquid refrigerant communication pipe 6, and the indoor liquid refrigerant pipes 53*a* and 53*b* to the indoor expansion valves 51*a* and 51*b*.

The state of the refrigerant circulating in the refrigerant circuit 10 becomes stable because of this cooling refrigerant charging operation, so when the refrigerant circuit 10 is charged with refrigerant, a state is created where the refrigerant gradually accumulates mainly in the section of the refrigerant circuit 10 leading from the outdoor heat exchanger 24 functioning as a radiator of the refrigerant through the outdoor liquid refrigerant pipe 26, the outdoor expansion valve 25, the refrigerant cooler 39, the liquid-side stop valve 31, the liquid refrigerant communication pipe 6, and the indoor liquid refrigerant pipes 53*a* and 53*b* to the indoor expansion valves 51*a* and 51*b*.

—Step ST12—

When the refrigerant circuit 10 is being charged with the refrigerant while the cooling refrigerant charging operation of step ST11 is being performed, the quantity of the refrigerant in the refrigerant circuit 10 gradually increases, and the refrigerant accumulates in the outdoor heat exchanger 24 functioning as a radiator of the refrigerant and in the liquid refrigerant communication pipe 6 on the downstream side thereof and so forth. Additionally, when the refrigerant circuit 10 becomes charged with the prescribed quantity of the refrigerant, a degree of subcooling SCo (or a state quantity equivalent to the degree of subcooling SCo) of the refrigerant in the outdoor heat exchanger 24 functioning as a radiator of the refrigerant reaches a refrigerant charging completion prescribed value Qt signifying that the refrigerant circuit 10 is charged with the prescribed quantity of the refrigerant.

For this reason, when the refrigerant circuit 10 is being charged with the refrigerant while the cooling refrigerant charging operation of step ST11 is being performed, the control component 8 utilizes the change in the degree of subcooling SCo (or a state quantity equivalent to the degree of subcooling SCo) of the refrigerant in the outdoor heat exchanger 24 functioning as a radiator of the refrigerant to determine in step ST12 whether or not a refrigerant charging completion condition signifying that the refrigerant circuit 10 has been charged with the prescribed quantity of the refrigerant is met. Here, as the degree of subcooling SCo of the refrigerant in the outdoor heat exchanger 24, a temperature difference obtained by subtracting the temperature Tol of the refrigerant at the liquid-side end of the outdoor heat exchanger 24 detected by the outdoor heat exchanger liquid-side sensor 45 from the condensation temperature Tc in the refrigerant circuit 10 can be used. As the condensation temperature Tc in the refrigerant circuit 10, a value obtained by converting the discharge pressure Pd of the compressor 21 detected by the discharge pressure sensor 43 to the saturation temperature of the refrigerant can be used. Because of this, when the quantity of the refrigerant with which the refrigerant circuit 10 has been charged has not reached the prescribed quantity, it is determined in step ST12 that the degree of subcooling SCo (or a state quantity equivalent to the degree of subcooling SCo) of the refrigerant in the outdoor heat exchanger 24 functioning as a radiator of the refrigerant has not reached the refrigerant charging completion prescribed value Qt, that is, that the refrigerant charging completion condition is not met, and so the process of step ST12 becomes repeated. Then, after it has been determined in step ST12 that the degree of subcooling SCo (or a state quantity equivalent to the degree of subcooling SCo) of the refrigerant in the outdoor heat exchanger 24 functioning as a radiator of the refrigerant has reached the refrigerant charging completion prescribed value Qt, that is, that the refrigerant charging completion condition is met, the control component 8 ends the charging of the refrigerant circuit 10 with the refrigerant from the refrigerant tank 90 or the like.

It should be noted that it is possible to use, as the state quantity equivalent to the degree of subcooling SCo and the refrigerant charging completion prescribed value Qt, a state quantity that changes in accompaniment with the change in the degree of subcooling SCo; for example, the control component 8 may calculate the quantity of the refrigerant in the refrigerant circuit 10 on the basis of the degree of subcooling SCo during the cooling refrigerant charging operation or another state quantity such as temperature or pressure, use this as the state quantity equivalent to the degree of subcooling SCo, and use the prescribed quantity of the refrigerant as the refrigerant charging completion prescribed value Qt.

<Second Refrigerant Charging Operation>

The second refrigerant charging operation in the refrigerant charging operation mode will be described using FIG. 3 and FIG. 5. Here, the second refrigerant charging operation is a refrigerant charging operation that is suited for a case where the outdoor temperature is low and one wants to avoid lowering the indoor temperatures; here, the second refrigerant charging operation is configured to be capable of being selected and instructed by a worker who performs the work of charging the refrigerant circuit 10 with the refrigerant.

First, as in the first refrigerant charging operation, prior to the second refrigerant charging operation, charging of the refrigerant circuit 10 with the refrigerant is enabled by, for example, connecting the refrigerant tank 90 to the refrigerant circuit 10 through the service nozzle 40. Here, in a case where the refrigerant circuit 10 is configured using the outdoor unit 2 charged with refrigerant beforehand, the refrigerant circuit 10 is filled with this refrigerant in advance. Furthermore, in a case where the outdoor unit 2 is not charged with refrigerant beforehand, the refrigerant circuit 10 is filled in advance with refrigerant from the refrigerant tank 90, for example, to an extent that device damage or the like does not occur when performing the second refrigerant charging operation.

Figure 5:
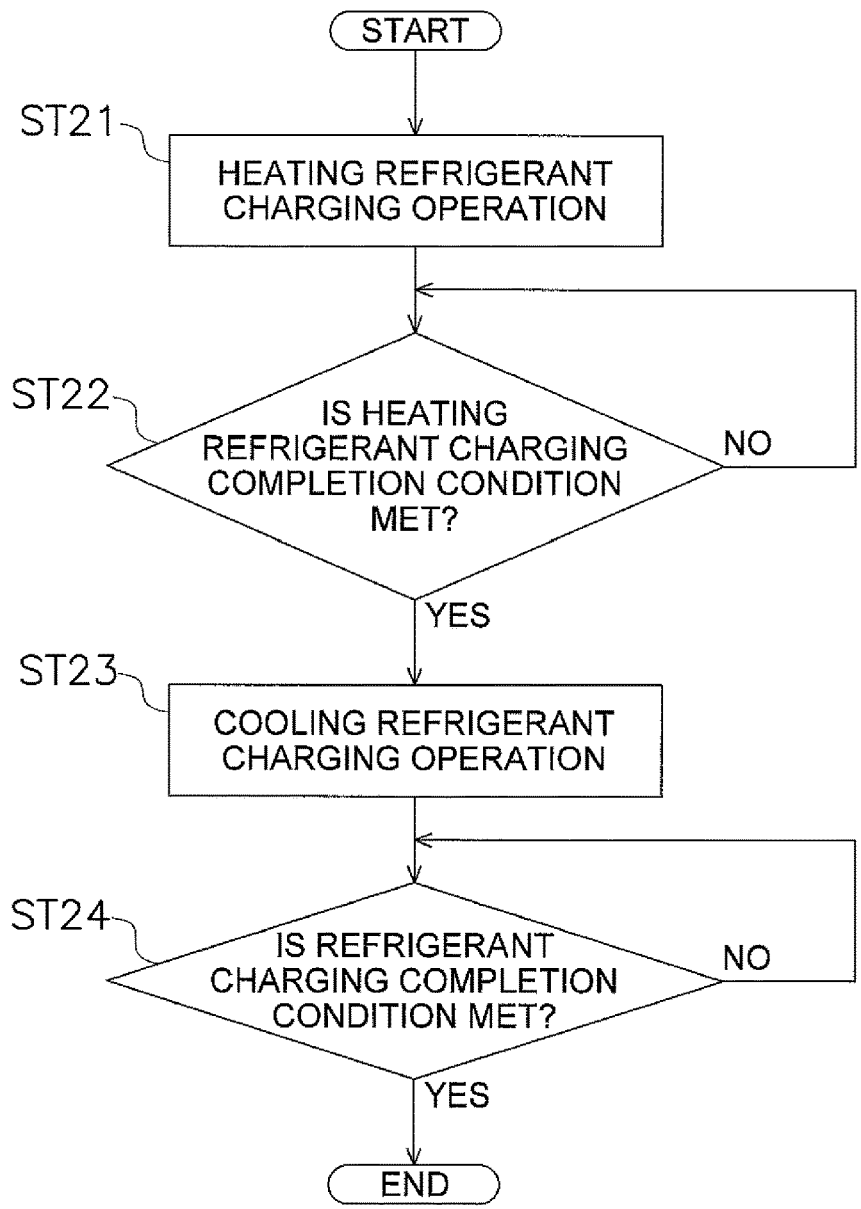
FIG. 5 is a flowchart of a second refrigerant charging operation.

Next, when an instruction for the second refrigerant charging operation is given by input from a remote controller (not shown in the drawings) or the like, the processes of steps ST21 to ST24 shown in FIG. 5 are performed by the control component 8.

—Step ST21—

When a command to start the second refrigerant charging operation is given, first, a heating refrigerant charging operation that controls constituent devices including the compressor 21 in such a way that the refrigerant in the refrigerant circuit 10 reaches a predetermined circulation state is performed in step ST21. Here, the predetermined circulation state in the heating refrigerant charging operation is a state in which the switching mechanism 23 switches in such a way that the refrigerant circuit 10 switches to the heating cycle state (the state indicated by the dashed lines of the switching mechanism 23 in FIG. 3) and all the indoor units 5a and 5b are controlled to forcibly perform the heating operation (hereafter called "all-indoor-units heating"). Because of this, in the compressor 21, low-pressure gas refrigerant flows while being compressed to a high pressure. In the section of the refrigerant circuit 10 leading from the discharge side of the compressor 21 through the discharge pipe 28, the switching mechanism 23, the second outdoor gas refrigerant pipe 30, the gas-side stop valve 32, the gas refrigerant communication pipe 7, and the indoor gas refrigerant pipes 54a and 54b to the gas-side ends of the indoor heat exchangers 52a and 52b, high-pressure gas refrigerant flows. In the indoor heat exchangers 52a and 52b, high-pressure refrigerant flows while undergoing a phase change from a gas state to a liquid state because of heat exchange with the indoor air. In the section of the refrigerant circuit 10 leading from the liquid-side ends of the indoor heat exchangers 52a and 52b through the indoor liquid refrigerant pipes 53a and 53b, the indoor expansion valves 51a and 51b, the liquid refrigerant communication pipe 6, the outdoor liquid refrigerant pipe 26, the liquid-side stop valve 31, and the refrigerant cooler 39 to the outdoor expansion valve 25, high-pressure liquid refrigerant flows. In the section of the refrigerant circuit 10 leading from the outdoor expansion valve 25 to the liquid-side end of the outdoor heat exchanger 24, low-pressure refrigerant in a gas-liquid two-phase state flows. In the outdoor heat exchanger 24, low-pressure refrigerant flows while undergoing a phase change from the gas-liquid two-phase state to a gas state because of heat exchange with the outdoor air. In the section of the refrigerant circuit 10 leading from the gas-side end of the outdoor heat exchanger 24 through the first outdoor gas refrigerant pipe 29, the switching mechanism 23, and the suction pipe 27 to the suction side of the compressor 21, low-pressure gas refrigerant flows. In this way, in the second refrigerant charging operation, the control component 8 first performs the heating refrigerant charging operation that performs heating of the rooms, rather than the cooling refrigerant charging operation that results in performing cooling of the rooms, in order to avoid lowering the indoor temperatures.

Moreover, here, the control component 8 controls (hereinafter called "high pressure control") the operating capacity of the compressor 21 (here, the rotational speed of the compressor motor 22) in such a way that the high pressure Pc (condensation temperature Tc) in the refrigerant circuit 10 becomes constant at a target high pressure Pcs (target condensation temperature Tcs). Here, as the high pressure Pc (condensation temperature Tc) in the refrigerant circuit 10, the discharge pressure Pd (a value obtained by converting the discharge pressure Pd to the saturation temperature of the refrigerant) of the compressor 21 detected by the discharge pressure sensor 43 can be used. This stabilizes the low pressure Pe (evaporation temperature Te) and the high pressure Pc (condensation temperature Tc) in the refrigerant circuit 10.

Furthermore, here, the control component 8 controls (hereinafter called "outdoor degree of superheat control") the opening degree of the outdoor expansion valve 25 in such a way that a degree of superheat SHo of the refrigerant in the outdoor heat exchanger 24 functioning as an evaporator of the refrigerant becomes constant at a target degree of superheat SHos. Here, as the degree of superheat SHo of the refrigerant in the outdoor heat exchanger 24, a temperature difference obtained by subtracting the evaporation temperature Te in the refrigerant circuit 10 from the suction temperature Ts detected by the suction temperature sensor 42 can be used. As the evaporation temperature Te in the refrigerant circuit 10, a value obtained by converting the suction pressure Ps of the compressor 21 detected by the suction pressure sensor 41 to the saturation temperature of the refrigerant can be used. Because of this, low-pressure gas refrigerant reliably flows in the section of the refrigerant circuit 10 leading from the gas-side end of the outdoor heat exchanger 24 through the first outdoor gas refrigerant pipe 29, the switching mechanism 23, and the suction pipe 27 to the suction side of the compressor 21. Furthermore, this stabilizes the quantity of the refrigerant accumulating in the outdoor heat exchanger 24 functioning as an evaporator of the refrigerant.

Moreover, here, the control component 8 controls (hereinafter called "indoor degree of subcooling control") the opening degrees of the indoor expansion valves 51a and 51b in such a way that degrees of subcooling SCra and SCrb of the refrigerant in the indoor heat exchangers 52a and 52b functioning as radiators of the refrigerant become constant at target degrees of subcooling SCras and SCrbs. Here, as the degrees of subcooling SCra and SCrb of the refrigerant in the indoor heat exchangers 52a and 52b, temperature differences obtained by subtracting the temperatures Trla and Trlb of the refrigerant at the liquid-side ends of the indoor heat exchangers 52a and 52b detected by the indoor heat exchanger liquid-side sensors 57a and 57b from the condensation temperature Tc in the refrigerant circuit 10 can be used. As the condensation temperature Tc in the refrigerant circuit 10, a value obtained by converting the discharge pressure Pd of the compressor 21 detected by the discharge pressure sensor 43 to the saturation temperature of the refrigerant can be used. Because of this, high-pressure liquid refrigerant flows in the section of the refrigerant circuit 10 leading from the indoor heat exchangers 52a and 52b through the indoor liquid refrigerant pipes 53a and 53b, the indoor expansion valves 51a and 51b, the liquid refrigerant communication pipe 6, the outdoor liquid refrigerant pipe 26, the liquid-side stop valve 31, and the refrigerant cooler 39 to the outdoor expansion valve 25.

The state of the refrigerant circulating in the refrigerant circuit 10 becomes stable because of this heating refrigerant charging operation, so when the refrigerant circuit 10 is charged with refrigerant, a state is created where the refrigerant gradually accumulates mainly in the section of the refrigerant circuit 10 leading from the indoor heat exchangers 52a and 52b functioning as radiators of the refrigerant through the indoor liquid refrigerant pipes 53a and 53b, the indoor expansion valves 51a and 51b, the liquid refrigerant communication pipe 6, the outdoor liquid refrigerant pipe 26, the liquid-side stop valve 31, and the refrigerant cooler 39 to the outdoor expansion valve 25.

—Step ST22—

When the refrigerant circuit 10 is being charged with the refrigerant while the heating refrigerant charging operation of step ST21 is being performed, the quantity of the refrigerant in the refrigerant circuit 10 gradually increases, and the refrigerant accumulates in the indoor heat exchangers 52a and 52b functioning as radiators of the refrigerant and in the liquid refrigerant communication pipe 6 on the downstream side thereof and so forth.

At this time, it is conceivable to perform the heating refrigerant charging operation until the refrigerant circuit 10 becomes charged with the prescribed quantity of the refrigerant. However, if the determination of whether or not the refrigerant circuit 10 has been charged with the refrigerant up to the prescribed quantity is performed on the basis of a state quantity of the indoor heat exchangers 52a and 52b functioning as radiators of the refrigerant in the heating refrigerant charging operation, the state quantity to be determined becomes plural by virtue of there being a plurality of the indoor heat exchangers 52a and 52b, and it is difficult to perform an appropriate determination. That is, in a case where there is a plurality of the indoor heat exchangers 52a and 52b, the ease with which the refrigerant accumulates differs depending on the indoor heat exchanger, so if the determination is performed on the basis of state quantities of all the indoor heat exchangers 52a and 52b, there is the concern that, at the point in time when it has been determined that the refrigerant has accumulated in an indoor heat exchanger in which it is difficult for the refrigerant to accumulate, the refrigerant will have excessively accumulated in an indoor heat exchanger in which it is easy for the refrigerant to accumulate, resulting in the refrigerant circuit 10 overall becoming overcharged. Furthermore, if the determination is performed on the basis of state quantities of some of the indoor heat exchangers, there is the concern that, at the point in time when it has been determined that the refrigerant has accumulated in an indoor heat exchanger in which it is easy for the refrigerant to accumulate, only a little refrigerant will have accumulated in an indoor heat exchanger in which it is difficult for the refrigerant to accumulate, resulting in the refrigerant circuit 10 overall becoming undercharged.

For this reason, in step ST22, in order to prevent the refrigerant circuit 10 overall from becoming overcharged, when the refrigerant circuit 10 is being charged with the refrigerant while the heating refrigerant charging operation of step ST21 is being performed, the control component 8 determines whether or not a heating refrigerant charging completion condition signifying that, even though the refrigerant has accumulated in any of the indoor heat exchangers 52a and 52b functioning as radiators of the refrigerant, the refrigerant circuit 10 overall is undercharged is met. That is, the control component 8 determines that the heating refrigerant charging completion condition is met in a case where the section of the refrigerant circuit 10 leading from the liquid-side end of any of the plural indoor heat exchangers 52a and 52b via the liquid refrigerant communication pipe 6 to the outdoor unit 2 is filled with the refrigerant in a liquid state. Additionally, here, utilizing the fact that the degrees of subcooling SCra and SCrb of the refrigerant in the indoor heat exchangers 52a and 52b become larger when the refrigerant accumulates in the indoor heat exchangers 52a and 52b functioning as radiators of the refrigerant, the control component 8 is configured to determine that the heating refrigerant charging completion condition is met in a case where the degree of subcooling SCra or SCrb of the refrigerant in any of the plural indoor heat exchangers 52a and 52b has become equal to or greater than a predetermined threshold degree of subcooling SCrat or SCrbt. Because of this, it is determined in step ST22 that the heating refrigerant charging completion condition is not met in a case where the degree of subcooling SCra or SCrb of the refrigerant in any of the plural indoor heat exchangers 52a and 52b functioning as radiators of the refrigerant has not reached the threshold degree of subcooling SCrat or SCrbt, and so the process of step ST22 becomes repeated. Then, after it has been determined in step ST22 that the degree of subcooling SCra or SCrb of the refrigerant in any of the plural indoor heat exchangers 52a and 52b functioning as radiators of the refrigerant has reached the threshold degree of subcooling SCrat or SCrbt, that is, that the heating refrigerant charging completion condition is met, the control component 8 ends the heating refrigerant charging operation.

—Step ST23—

After the heating refrigerant charging operation of step ST21 has been performed until the heating refrigerant charging completion condition of step ST22 is met, next, in step ST23 the control component 8 is switched to the same cooling refrigerant charging operation as in step ST11 in the first refrigerant charging operation. The specific content of the cooling refrigerant charging operation is the same as that of the cooling refrigerant charging operation of step ST11, so description will be omitted here. Because of this, the refrigerant circuit 10 that is undercharged at the point in time when the heating refrigerant charging completion condition is met becomes further charged with refrigerant.

—Step ST24—

When the refrigerant circuit 10 is being charged with the refrigerant while the cooling refrigerant charging operation of step ST23 is being performed, the quantity of the refrigerant in the refrigerant circuit 10 further increases, and the refrigerant accumulates in the outdoor heat exchanger 24 functioning as a radiator of the refrigerant. Additionally, when the refrigerant circuit 10 becomes charged with the prescribed quantity of the refrigerant, as in step ST12 in the first refrigerant charging operation, the degree of subcooling SCo (or a state quantity equivalent to the degree of subcooling SCo) of the refrigerant in the outdoor heat exchanger 24 functioning as a radiator of the refrigerant reaches the refrigerant charging completion prescribed value Qt signifying that the refrigerant circuit 10 is charged with the prescribed quantity of the refrigerant.

For this reason, as in step ST12 in the first refrigerant charging operation, when the refrigerant circuit 10 is being charged with the refrigerant while the cooling refrigerant charging operation of step ST23 is being performed, the control component 8 utilizes the change in the degree of subcooling SCo (or a state quantity equivalent to the degree of subcooling SCo) of the refrigerant in the outdoor heat exchanger 24 functioning as a radiator of the refrigerant to determine in step ST24 whether or not the refrigerant charging completion condition signifying that the refrigerant circuit 10 has been charged with the prescribed quantity of the refrigerant is met. Because of this, when the quantity of the refrigerant with which the refrigerant circuit 10 has been charged has not reached the prescribed quantity, it is determined in step ST24 that the degree of subcooling SCo (or a state quantity equivalent to the degree of subcooling SCo) of the refrigerant in the outdoor heat exchanger 24 functioning as a radiator of the refrigerant has not reached the refrigerant charging completion prescribed value Qt, that is, that the refrigerant charging completion condition is not met, and so the process of step ST24 becomes repeated. Then, after it has been determined in step ST24 that the degree of subcooling SCo (or a state quantity equivalent to the degree of subcooling SCo) of the refrigerant in the outdoor heat exchanger 24 functioning as a radiator of the refrigerant has reached the refrigerant charging completion prescribed value Qt, that is, that the refrigerant charging completion condition is met, the control component 8 ends the charging of the refrigerant circuit 10 with the refrigerant from the refrigerant tank 90 or the like.

(4) CHARACTERISTICS OF REFRIGERANT CHARGING OPERATION OF AIR CONDITIONING APPARATUS

The refrigerant charging operation of the air conditioning apparatus 1 has the following characteristics.

<A>

Here, in the above-described second refrigerant charging operation, when charging the refrigerant circuit 10 with the refrigerant, the control component 8 is configured to first perform the heating refrigerant charging operation until the heating refrigerant charging completion condition is met (see steps ST21 and ST22), so in comparison to a case where just the cooling refrigerant charging operation is performed, a lowering of the indoor temperatures can be avoided. Moreover, here, after the heating refrigerant charging completion condition has been met, the control component 8 is configured to switch to the cooling refrigerant charging operation and perform the cooling refrigerant charging operation until the refrigerant charging completion condition where the refrigerant circuit 10 is charged with the prescribed quantity of the refrigerant is met (see steps ST22 to ST24), so in comparison to a case where just the heating refrigerant charging operation is performed, the effects of differences in the ease with which the refrigerant accumulates in each of the indoor heat exchangers 52a and 52b can be reduced to prevent overcharging or undercharging of the refrigerant circuit 10 overall.

In this way, here, as described above, by performing a combination of the heating refrigerant charging operation and the cooling refrigerant charging operation, a refrigerant charging operation that does not excessively lower the indoor temperatures and can appropriately charge the refrigerant circuit 10 with the prescribed quantity of the refrigerant even in a case where the outdoor temperature is low can be made possible.

<B>

Here, in the above-described second refrigerant charging operation, the control component 8 regards the heating refrigerant charging completion condition as being met in a case where it can determine that the section of the refrigerant circuit 10 leading from the liquid-side end of any of the plural indoor heat exchangers 52a and 52b via the liquid refrigerant communication pipe 6 to the outdoor unit 2 is filled with the refrigerant in a liquid state (see step ST22). For this reason, reaching the heating refrigerant charging completion condition after the start of the heating refrigerant charging operation means reaching a state in which the refrigerant has accumulated in some of the indoor heat exchangers in which it is easy for the refrigerant to accumulate and the refrigerant has also accumulated in the liquid refrigerant communication pipe 6 on the downstream side thereof. That is, here, by performing the heating refrigerant charging operation until the heating refrigerant charging completion condition is met, the control component 8 can, while preventing the refrigerant circuit 10 from becoming overcharged, put the refrigerant circuit 10 in a state in which the refrigerant has accumulated in some of the indoor heat exchangers and the refrigerant has also accumulated in the liquid refrigerant communication pipe 6.

Because of this, here, by employing the above-described heating refrigerant charging completion condition, the control component 8 can create a state in which the refrigerant circuit 10 is charged with a quantity of the refrigerant that is close to the prescribed quantity even though the refrigerant circuit 10 overall is undercharged, and the operating time of the cooling refrigerant charging operation performed after the heating refrigerant charging operation can be shortened to further keep the indoor temperatures from becoming lower.

<C>

In the above-described second refrigerant charging operation, the degrees of subcooling SCra and SCrb of the refrigerant in the indoor heat exchangers 52a and 52b become larger when the refrigerant accumulates in the indoor heat exchangers 52a and 52b, so whether or not the refrigerant has accumulated in the indoor heat exchangers 52a and 52b can be detected. Thus, here, in the above-described second refrigerant charging operation, the control component 8 is configured to determine, based on whether or not the degrees of subcooling SCra and SCrb of the refrigerant in the indoor heat exchangers 52a and 52b have become equal to or greater than the threshold degree of subcooling SCrat and SCrbt, whether or not the heating refrigerant charging completion condition is met (see step ST22).

Because of this, here, whether or not the refrigerant has accumulated in the indoor heat exchangers 52a and 52b can be reliably determined by employing the above-described heating refrigerant charging completion condition.

<D>

The above-described second refrigerant charging operation is suited for a case where the outdoor temperature is low and one wants to avoid lowering the indoor temperatures, but in a case where the outdoor temperature is not low, it is alright not to avoid lowering the indoor temperatures, so when charging the refrigerant circuit 10 with the refrigerant, performing just the cooling refrigerant charging operation of the second refrigerant charging operation (see step ST23) is permitted. Thus, here, as in the above-described first refrigerant charging operation, when charging the refrigerant circuit 10 with the refrigerant, the control component 8 is configured to also be able to start the cooling refrigerant charging operation and perform the cooling refrigerant charging operation until the refrigerant charging completion condition is met (see steps ST11 and ST12), without performing the heating refrigerant charging operation (see step ST21).

Because of this, here, as described above, the control component 8 is configured to also be able to perform just the cooling refrigerant charging operation, so that a refrigerant charging operation that can appropriately charge the refrigerant circuit 10 with the prescribed quantity of the refrigerant also in a case where the outdoor temperature is not low can be made possible.

(5) EXAMPLE MODIFICATIONS

Example Modification 1

In the above-described embodiment, the control component 8 regards the heating refrigerant charging completion condition of step ST22 in the second refrigerant charging operation as being met in a case where the degree of subcooling SCra or SCrb of the refrigerant in any of the indoor heat exchangers 52a and 52b has become equal to or greater than the threshold degree of subcooling SCrat or SCrbt.

However, the control component 8 is not limited to this and may also regard the heating refrigerant charging completion condition as being met in a case where a temperature difference ΔTlp between the temperature Trla or Trlb of the refrigerant in any of the plural indoor heat exchangers 52a and 52b and the temperature Tlp of the refrigerant flowing through the liquid refrigerant communication pipe 6 has become equal to or less than a predetermined threshold liquid temperature difference ΔTlpt. That is, when the refrigerant accumulates in the liquid refrigerant communication pipe 6, the temperature of the refrigerant in the section of the liquid refrigerant communication pipe 6 near the outdoor unit 2 becomes closer to the temperature of the refrigerant in the section of the liquid refrigerant communication pipe 6 near the indoor units 5a and 5b, so whether or not the refrigerant has accumulated in the liquid refrigerant communication pipe 6 can be detected.

Because of this, here, whether or not the refrigerant has accumulated in the liquid refrigerant communication pipe 6 can be reliably determined by employing the above-described heating refrigerant charging completion condition.

Example Modification 2

In the above-described embodiment, the control component 8 regards the heating refrigerant charging completion condition of step ST22 in the second refrigerant charging operation as being met in a case where the degrees of subcooling SCra and SCrb of the refrigerant in the indoor heat exchangers 52a and 52b have become equal to or greater than the threshold degrees of subcooling SCrat and SCrbt.

However, the control component 8 is not limited to this and may also regard the heating refrigerant charging completion condition as being met in a case where an opening degree MVra or MVrb of any of the plural indoor expansion valves 51a and 51b has become equal to or greater than a predetermined threshold valve opening degree MVrat or MVrbt. That is, when the refrigerant accumulates in the indoor heat exchangers 52a and 52b, the degrees of subcooling SCra and SCrb of the refrigerant in the indoor heat exchangers 52a and 52b become larger. At this time, as the control component 8 controls the opening degrees MVra and MVrb of the indoor expansion valves 51a and 51b in such a way as to bring the degrees of subcooling SCra and SCrb of the refrigerant in the indoor heat exchangers 52a and 52b closer to the target degrees of subcooling SCras and SCrbs as in the above-described embodiment, the opening degrees MVra and MVrb of the indoor expansion valves 51a and 51b become larger as the degrees of subcooling SCra and SCrb of the refrigerant in the indoor heat exchangers 52a and 52b become larger, so whether or not the refrigerant has accumulated in the indoor heat exchangers 52a and 52b can be detected.

Because of this, here, whether or not the refrigerant has accumulated in the indoor heat exchangers 52a and 52b can be reliably determined by employing the above-described heating refrigerant charging completion condition.

Example Modification 3

In above-described embodiment and example modifications 1 and 2, the control component 8 individually employs, as the heating refrigerant charging completion condition of step ST22, the condition using the degrees of subcooling SCra and SCrb of the refrigerant in the indoor heat exchangers 52a and 52b, the condition using the temperature difference ΔTlp between the temperatures of Trla and Trlb of the refrigerant in the indoor heat exchangers 52a and 52b and the temperature Tlp of the refrigerant flowing through the liquid refrigerant communication pipe 6, and the condition using the opening degrees MVra and MVrb of the indoor expansion valves 51a and 51b.

However, the control component 8 is not limited to this and may also appropriately combine these three conditions as the heating refrigerant charging completion condition. For example, the control component 8 can determine that the heating refrigerant charging completion condition is met in a case where any one or two of the three conditions is met.

Example Modification 4

In the above-described embodiment and example modifications 1 to 3, when charging the refrigerant circuit 10 with the refrigerant, the worker who performs the work of charging the refrigerant circuit 10 with the refrigerant selects which of the first refrigerant charging operation (see steps ST11 and ST12) and the second refrigerant charging operation (see steps ST21 to ST24) to perform (i.e., whether or not to perform the heating refrigerant charging operation of step ST21).

Figure 6:
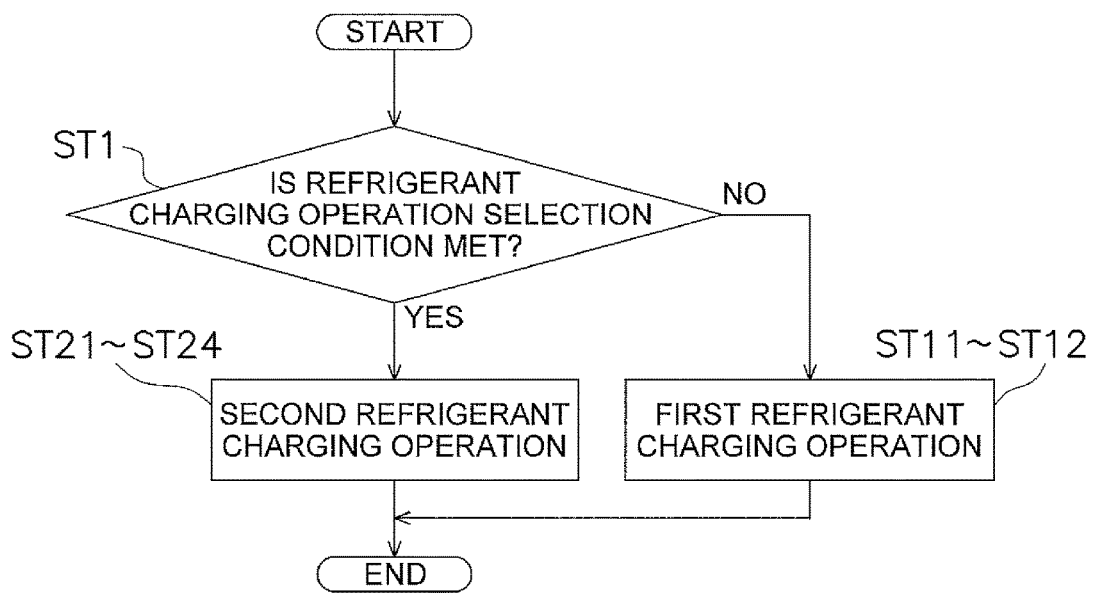
FIG. 6 is a flowchart of a refrigerant charging operation mode pertaining to example modification 4.

However, the air conditioning apparatus 1 is not limited to this, and the control component 8 may be configured to select, in accordance with the outdoor temperature or the indoor temperatures, which of the first refrigerant charging operation and the second refrigerant charging operation to perform (i.e., whether or not to perform the heating refrigerant charging operation) when charging the refrigerant circuit 10 with the refrigerant. For example, using as the outdoor temperature the temperature Toa of the outdoor air detected by the outdoor air sensor 46 and using as the indoor temperatures the temperatures Traa and Trba of the indoor air detected by the indoor air sensors 59a and 59b, the control component 8 can determine that a refrigerant charging operation selection condition of step ST1 shown in FIG. 6 is met in a case where any or all of these temperatures are equal to or less than predetermined threshold temperatures. That is, in a case where the refrigerant charging operation selection condition of step ST1 is met, the control component 8 is configured to select and perform the second refrigerant charging operation of steps ST21 to ST24, and in a case where the refrigerant charging operation selection condition of step ST1 is not met, the control component 8 is configured to select and perform the first refrigerant charging operation of steps ST11 and ST12.

Because of this, here, as described above, by selecting whether or not to perform the heating refrigerant charging operation in accordance with the outdoor temperature or the indoor temperatures, the control component 8 can appropriately choose between performing a refrigerant charging operation that performs a combination of the heating refrigerant charging operation and the cooling refrigerant charging operation and a refrigerant charging operation that performs just the cooling refrigerant charging operation.

INDUSTRIAL APPLICABILITY

The present invention is widely applicable to air conditioning apparatuses equipped with a refrigerant circuit that is configured as a result of an outdoor unit having an outdoor heat exchanger and plural indoor units having indoor heat exchangers being interconnected via a liquid refrigerant communication pipe and a gas refrigerant communication pipe.

REFERENCE SIGNS LIST

1 Air Conditioning Apparatus
2 Outdoor Unit
5a, 5b Indoor Units
6 Liquid Refrigerant Communication Pipe
7 Gas Refrigerant Communication Pipe
8 Control Component
10 Refrigerant Circuit 24 Outdoor Heat Exchanger
51a, 51b Indoor Expansion Valves
52a, 52b Indoor Heat Exchangers

CITATION LIST

Patent Literature

Patent Document 1: JP-A No. 2011-85390

The invention claimed is:

1. An air conditioning apparatus comprising:
a refrigerant circuit that is configured as a result of an outdoor unit having an outdoor heat exchanger and plural indoor units having indoor heat exchangers being interconnected via a liquid refrigerant communication pipe and a gas refrigerant communication pipe, the refrigerant circuit being switchable to a cooling cycle state, which causes the outdoor heat exchanger to function as a radiator of a refrigerant and causes the indoor heat exchangers to function as evaporators of the refrigerant, and a heating cycle state, which causes the outdoor heat exchanger to function as an evaporator of the refrigerant and causes the indoor heat exchangers to function as radiators of the refrigerant; and
a controller configured to control devices configuring the outdoor unit and the plural indoor units,
wherein when charging the refrigerant circuit with the refrigerant under a particular temperature condition, the controller starts a heating refrigerant charging operation that is performed by switching the refrigerant circuit to the heating cycle state, performs the heating refrigerant charging operation until a predetermined heating refrigerant charging completion condition is met, thereafter switches to a cooling refrigerant charging operation that is performed by switching the refrigerant circuit to the cooling cycle state, and performs the cooling refrigerant charging operation until a refrigerant charging completion condition where the refrigerant circuit is charged with a prescribed quantity of the refrigerant is met.

2. The air conditioning apparatus according to claim 1, wherein
the controller regards the heating refrigerant charging completion condition as being met in a case where the controller determines that a section of the refrigerant circuit leading from a liquid-side end of any of the plural indoor heat exchangers via the liquid refrigerant communication pipe to the outdoor unit is filled with the refrigerant in a liquid state.

3. The air conditioning apparatus according to claim 1, wherein
the controller regards the heating refrigerant charging completion condition as being met in a case where a degree of subcooling of the refrigerant in any of the plural indoor heat exchangers has become equal to or greater than a predetermined threshold degree of subcooling.

4. The air conditioning apparatus according to claim 1, wherein
the controller regards the heating refrigerant charging completion condition as being met in a case where a temperature difference between a temperature of the refrigerant in any of the plural indoor heat exchangers and a temperature of the refrigerant flowing through the liquid refrigerant communication pipe has become equal to or less than a predetermined threshold liquid temperature difference.

5. The air conditioning apparatus according to claim 1, wherein
each of the plural indoor units has, on the liquid-side end of the respective indoor heat exchanger, an indoor expansion valve that adjusts a flow rate of the refrigerant flowing through the respective indoor heat exchanger, and
the controller regards the heating refrigerant charging completion condition as being met in a case where an opening degree of any of the plural indoor expansion valves has become equal to or greater than a predetermined threshold valve opening degree.

6. The air conditioning apparatus according to claim 1, wherein
when charging the refrigerant circuit with the refrigerant under a different condition than the particular temperature condition, the controller starts the cooling refrigerant charging operation and performs the cooling refrigerant charging operation until the refrigerant charging completion condition is met, without performing the heating refrigerant charging operation.

7. The air conditioning apparatus according to claim 6, wherein
the controller selects, in accordance with an outdoor temperature or indoor temperatures, whether or not to perform the heating refrigerant charging operation when charging the refrigerant circuit with the refrigerant.

8. The air conditioning apparatus according to claim 3, wherein
the controller regards the heating refrigerant charging completion condition as being met in a case where, in addition to the degree of subcooling of the refrigerant in any of the plural indoor heat exchangers becoming equal to or greater than the predetermined threshold degree of subcooling, a temperature difference between a temperature of the refrigerant in any of the plural indoor heat exchangers and a temperature of the refrigerant flowing through the liquid refrigerant communication pipe has become equal to or less than a predetermined threshold liquid temperature difference.

9. The air conditioning apparatus according to claim 3, wherein
the plural indoor units each have, on the liquid-side end of the indoor heat exchanger, an indoor expansion valve that adjusts a flow rate of the refrigerant flowing through the indoor heat exchanger, and
the controller regards the heating refrigerant charging completion condition as being met in a case where, in addition to the degree of subcooling of the refrigerant in any of the plural indoor heat exchangers becoming equal to or greater than the predetermined threshold degree of subcooling, an opening degree of any of the plural indoor expansion valves has become equal to or greater than a predetermined threshold valve opening degree.

10. The air conditioning apparatus according to claim 4, wherein
the plural indoor units each have, on the liquid-side end of the indoor heat exchanger, an indoor expansion valve that adjusts a flow rate of the refrigerant flowing through the indoor heat exchanger, and
the controller regards the heating refrigerant charging completion condition as being met in a case where, in addition to the temperature difference between the temperature of the refrigerant in any of the plural indoor heat exchangers and the temperature of the refrigerant flowing through the liquid refrigerant communication pipe becoming equal to or less than the predetermined threshold liquid temperature difference, an opening degree of any of the plural indoor expansion valves has become equal to or greater than a predetermined threshold valve opening degree.

11. The air conditioning apparatus according to claim 2, wherein when charging the refrigerant circuit with the refrigerant under a different condition than the particular temperature condition, the controller starts the cooling refrigerant charging operation and performs the cooling refrigerant charging operation until the refrigerant charging completion condition is met, without performing the heating refrigerant charging operation.

12. The air conditioning apparatus according to claim 3, wherein when charging the refrigerant circuit with the refrigerant under a different condition than the particular temperature condition, the controller starts the cooling refrigerant charging operation and performs the cooling refrigerant charging operation until the refrigerant charging completion condition is met, without performing the heating refrigerant charging operation.

13. The air conditioning apparatus according to claim 4, wherein when charging the refrigerant circuit with the refrigerant under a different condition than the particular temperature condition, the controller starts the cooling refrigerant charging operation and performs the cooling refrigerant charging operation until the refrigerant charging completion condition is met, without performing the heating refrigerant charging operation.

14. The air conditioning apparatus according to claim 5, wherein when charging the refrigerant circuit with the refrigerant under a different condition than the particular temperature condition, the controller starts the cooling refrigerant charging operation and performs the cooling refrigerant charging operation until the refrigerant charging completion condition is met, without performing the heating refrigerant charging operation.

15. The air conditioning apparatus according to claim 11, wherein the controller selects, in accordance with an outdoor temperature or indoor temperatures, whether or not to perform the heating refrigerant charging operation when charging the refrigerant circuit with the refrigerant.

16. The air conditioning apparatus according to claim 12, wherein the controller selects, in accordance with an outdoor temperature or indoor temperatures, whether or not to perform the heating refrigerant charging operation when charging the refrigerant circuit with the refrigerant.

17. The air conditioning apparatus according to claim 13, wherein the controller selects, in accordance with an outdoor temperature or indoor temperatures, whether or not to perform the heating refrigerant charging operation when charging the refrigerant circuit with the refrigerant.

18. The air conditioning apparatus according to claim 14, wherein the controller selects, in accordance with an outdoor temperature or indoor temperatures, whether or not to perform the heating refrigerant charging operation when charging the refrigerant circuit with the refrigerant.

* * * * *